May 28, 1940.　　　D. K. PATTILLOCH　　　2,202,717
PROCESS OF MAKING PAPER
Filed March 20, 1936
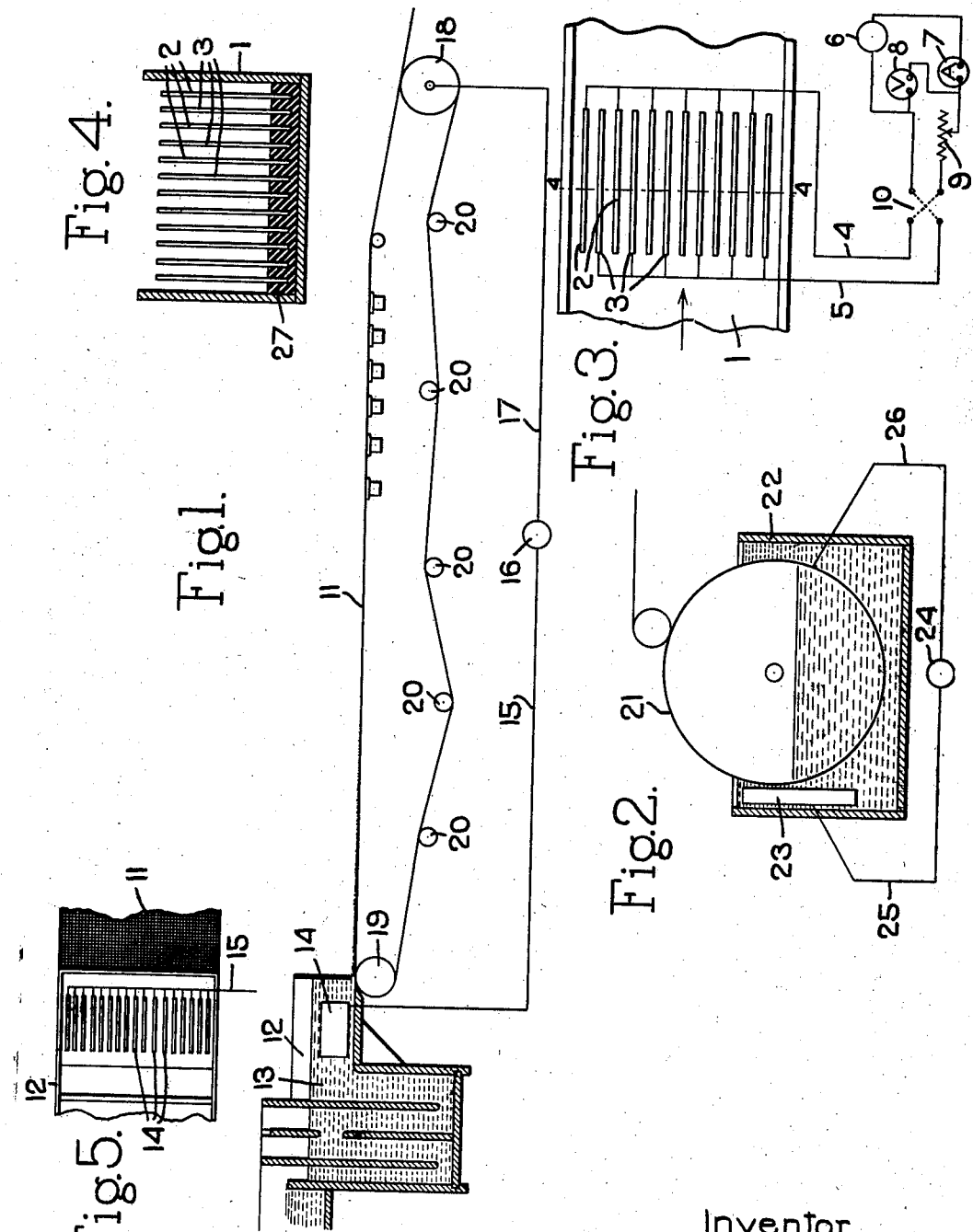
Inventor.
Donald K. Pattilloch
by Heard Smith & Tennant.
Attys.

Patented May 28, 1940

2,202,717

UNITED STATES PATENT OFFICE 2,202,717

PROCESS OF MAKING PAPER

Donald K. Pattilloch, Boston, Mass., assignor to Pattilloch Processes, Inc., Boston, Mass., a corporation of Massachusetts Application March 20, 1936, Serial No. 69,844

3 Claims. (Cl. 92—21)

This invention relates to the manufacture of paper and especially to the manufacture of paper containing amylaceous bonding material and/or wax or rosin sizing material and/or clay or other filling or loading material.

One object of the invention is to provide an improved process of making paper which not only results in an increased bonding action between the cellulose fibre and any amylaceous bonding material contained in the fibre-water mixture and also an increased bonding action between the cellulose fibre and sizing material used and an improved clay retention, but also provides a means by which the pH value of the fibre-water mixture may also be accurately controlled.

It is generally agreed that cellulose fibres in a fibre-water mixture normally have a negative electrical surface charge, the intensity of which varies with different kinds of fibre and varying water conditions. It is also generally agreed that when amylaceous bonding material, such as starch in any of its various forms, is added to fibre-water mixture the bonding material particles, whether in the suspensoidal or in the colloidal form, usually are negatively charged or carry negative electrical surface charges.

When these conditions exist in a fibre-water mixture containing amylaceous bonding material and from which paper is being made, the bonding or cementing of the starch particles to the cellulose fibre brings together two particles normally having the same electrical charge, with the result that there is set up between such bonded particles an electrical repelling force which tends to decrease the chemical-physical bonding action between the bonded particles.

One feature of the present invention relates to a novel method of paper manufacture by which this repelling action between the cellulose fibre and the starch particles, whether caused electrically or otherwise, may not only be eliminated but may be replaced by an electrostatic bonding action which augments the chemical-physical bonding action and thus makes a more perfect bond between the cellulose fibres and the amylaceous bonding material.

This result is secured by subjecting the fibre-water mixture to the action of an electrical current which results in decreasing or eliminating the repelling action between the starch particles and the cellulose fibre due to their normally having the same electrical charge and provides the electrostatic bond above referred to.

In the case of fibre-water mixture containing a rosin alum size precipitate, or a rosin soap, or clay or other filling or loading material, the particles of which carry negative charges of electricity, this same electrical treatment results in an electrostatic bonding action between the cellulose fibres on one hand and the rosin size alum precipitates or the particles of clay or other filling or loading material so that the bonding or cementing of the rosin size precipitate and/or the clay or other filling or loading material to the cellulose fibre may be accomplished without the use of chemicals to provide the bonding element having the positive surface charge.

According to one way of carrying out the invention I provide suitable oppositely-charged electrodes which are so placed that the fibre-water mixture will flow over or by them. Such electrodes will preferably be submerged in the fibre-water mixture but may have any location which will permit them to subject the fibre-water mixture to the desired electrical treatment. The electrodes may be provided with opposite electrical charges in any suitable way, one convenient way being to connect said electrodes to opposite poles of a direct current generator so that one of the electrodes will be in the nature of an anode carrying a positive electrical charge and the other will be in the nature of a cathode carrying a negative electrical charge.

The negatively-charged colloids in a fibre-water mixture, such as starch, clay, rosin alum size precipitate, etc., are much more active and faster moving in the mixture than the negatively-charged cellulose fibres. As the fibre-water mixture flows past, by or over the electrodes the rapidly moving active negatively-charged colloids are attracted or drawn toward the positive electrodes or anodes much more rapidly than the slower moving cellulose fibre. The active rapidly-moving colloids that contact with the positive electrodes become positively charged and are then discharged from the electrode as a gel with a positive electrical surface charge. When thus positively charged these colloids are attached to the negatively-charged cellulose fibres, which, because of their sluggishness, have not been attracted into contact with the positive electrodes, and as the positively-charged colloids contact or unite with the negatively-charged fibres the electrostatic bond above-referred to between the colloids and the fibres is set up.

In carrying out the invention it is desirable that the rate of flow of the fibre-water mixture should have such a relation to the shape, size and position of the electrodes and to the intensity of the current with which they are charged that the time during which any portion of the fibre-water mixture is subjected to the electrical action will be long enough to permit the more active negatively-charged colloids to be attracted to and contacted with the anodes, but will not be sufficiently long to enable the slower moving negatively-charged cellulose fibres to be attracted to the anodes in any appreciable amount. Thus the cellulose fibre passes through the sphere of electrical action without having its surface charge of electricity changed from negative to positive, while such change is effected in the negatively-charged colloids because of their greater activity and freedom of movement.

As the fibre-water mixture flows past, by or over the electrodes the colloids which have thus received the positive charge have ample time either to attach themselves to an inactive colloid of rosin alum size precipitate, starch or clay to precipitate the combination, which has a positive electrical charge, on the negatively-charged cellulose, or else such positively-charged colloids have been attracted to the negatively-charged cellulose to form, in effect, a positively-charged surface to which a portion of the colloids which have not had their surface charge changed from negative to positive are attracted and bonded electrostatically.

I have found from microscopic examinations of paper containing starch that in a paper made from a furnish to which the starch has been added in suspensoidal or colloidal form by any of the customary prior methods, the starch particles have a globular form, while in a paper made by the method herein disclosed, the starch particles have more of an egg-shape form, which shows that the process herein described has had a marked effect on the physical structure of the starch particles. Indications are that similar changes will take place in the rosin alum size precipitate particles due to the practise of the present invention.

It is known that negatively-charged colloids, such as starch, clay, rosin alum size precipitate, etc., will be effectively precipitated by positive ions, other than hydrogen ions, or by other positive colloids of higher chemical valence, and that the presence of certain negatively-charged active ions hinders or neutralizes this effect in that such negatively-charged ions act as a buffer. The most predominant negatively-charged ion in a fibre-water mixture from which paper is made is the $SO_4$ ion which results from the hydrolysis of alum added to the fibre-water mixture. These buffering or neutralizing $SO_4$ ions may be removed by the electrical treatment herein described, thereby facilitating the movement of the starch or rosin sizing colloids toward the anodes and promoting their electrostatic combination with the negatively-charged cellulose.

While electrolytic action normally does not change the pH value of a simple chemical solution, we have found that because of the complexity of the chemical nature of a fibre-water mixture, such as that used in paper-making operations, the electrical treatment above referred to can be used to change or control the pH value thereof, which is contrary to the theory of ordinary ionization.

The term "pH value" as applied to fibre-water mixture, is a term indicating the concentration of the hydrogen ions, which are positively-charged ions, with respect to the hydroxyl ions, which are negatively-charged ions.

A pH value of 7 indicates a balanced condition between the positively-charged hydrogen ions and the negatively-charged hydroxyl ions, and hence a neutral condition; a pH value less then 7 indicates an excess of the positively-charged hydrogen ions and an acid condition; while a pH value greater than 7 indicates an excess of the hydroxyl ions and an alkaline condition.

Paper mill operations are usually carried out with an acid furnish, that is, a furnish having a pH value below 7, although some mills operate with a furnish having a neutral or even an alkaline pH value.

Where rosin size is added to the fibre-water mixture it is the common practise to precipitate the size by adding alum, and in order to secure a proper precipitation of the size on the cellulose fibres an amount of alum is generally used which lowers the pH value of the fibre-water mixture sometimes as low as 4.5 or less, which indicates quite an acid condition.

It is well understood in the paper-making art that paper made from an acid furnish is subject to chemical deterioration and the rapidity of such deterioration depends to a considerable extent upon the degree of acidity of the furnish. It is, therefore, desirable to reduce the acidity and to raise the pH value of the fibre-water mixture before the point of paper formation and this is commonly done by adding alkaline chemicals to the furnish.

My improved process provides a method by which the pH value of the fibre-water mixture can be raised and can be readily controlled without the use of chemicals for this purpose and entirely by the electrical treatment of the fibre-water mixture, although under certain conditions it may be advantageous to supplement the electrical treatment with chemical treatment as described in Patent No. 2,036,882, April 7, 1936.

As stated above the pH value of the fibre-water mixture is an indication of the concentration of the hydrogen ions and a fibre-water mixture having a pH value of 4.5 has a large excess of the active positively-charged hydrogen ions. As the fibre-water mixture flows past or over the electrodes and electrolytic action takes place, there will be a cataphoresis reaction which drives the positively-charged hydrogen ions to the negative electrode or cathode from whence they discharge as hydrogen gas. In this way the amount of these active hydrogen ions in the solution is decreased with a resultant elevation of the pH value of the fibre-water mixture.

The hydroxyl ions are present in the fibre-water mixture in relatively small quantities at the low pH values so that the electrolytic process expels from the fibre-water mixture many more positively-charged hydrogen ions than negatively-charged hydroxyl ions.

From repeated observations I have made I find that the fibre-water mixture develops a decided increase in pH value in passing over, through or by the oppositely-charged electrodes. If, for instance, the fibre-water mixture immediately before contacting the oppositely-charged electrodes has pH values of from 4.3 to 4.6, it will, immediately after contacting with the oppositely-charged electrodes, have an elevated pH value of from 4.7 to 5.2, the change in pH value being found to be dependent on the intensity of uni-directional current applied flowing from the anode to the cathode.

My improved process, therefore, provides an electrical means for reducing the hydrogen ion concentration in the fibre-water mixture and thus raising its pH value, and by properly controlling the intensity of the electric current flowing from the anode to the cathode through the fibre-water mixture it is possible to bring and maintain the pH value to any desired point.

Theoretically there will be a maximum coagulation and electrostatic bonding between the cellulose fibre and the amylaceous bonding material and/or sizing material and/or loading material at the effective isoelectric point of the fibre-water mixture, at which point there is an electrical balance of the positive and negative charges on the ingredients of the furnish and a resultant zero velocity to the colloidal particles.

It is well known that different colloids and particles have different and definite isoelectric points. Theoretically in a fibre-water mixture containing many colloids and particles there would be many isoelectric points dependent upon the isoelectric points of the constituent colloids or particles. Actually, experiments have shown that any definite fibre-water mixture has a definite effective isoelectric point, which is preferably expressed as a composite result of the commingled colloids and particles in the mixture and which also depends somewhat on the type or types of cellulose fibre used in the mix. Hence different furnishes will have different isoelectric points, and these points, which can be readily determined by known methods, will vary with the variation in cellulose and chemical constituents of the furnish.

For example, I have on different occasions made paper by this process with furnishes having pH values of 4.9, 5.2, 5.6, 6.4 and others, which pH values were determined by known methods to be the effective isoelectric points of the mixture.

There are advantages in maintaining the fibre-water mixture at its effective isoelectric point and this may be readily done through the practise of my improved process.

As the effective isoelectric point of the fibre-water mixture is approached the electric resistance of the mixture increases and at the effective isoelectric point the resistance is such that it is practically impossible to force more current through mixture, and electric cataphoresis action practically ceases. Any departure from the isoelectric point will reduce the resistance allowing more current to flow through thereby causing a renewal of the cataphoresis action which will result in bringing the fibre-water mixture back to the iso-electric point. With my improved process, therefore, the fibre-water mixture will be automatically maintained at the isoelectric point and a stable electrical balance in the mixture is maintained, a result which is not possible where the pH value of the mixture is being controlled by the use of chemicals.

This is shown by experiments which I have conducted in an attempt to regulate and maintain the pH value of a fibre-water mixture at its effective isoelectric point by means of chemical additions. As the pH value of the fibre-water mixture increased or decreased towards the effective isoelectric point by the continuous addition of suitable alkalis or acids there was a marked tendency of the fibre-water mixture to become increasingly sensitive to the chemical reaction, and as the effective isoelectric point was closely approached the addition or decrease of carefully-controlled quantities of added chemicals caused extreme fluctuations in pH value, it being impossible to control the chemical addition, even by the most delicate adjustments, so as to hold the pH value constant at the points which were determined to be the effective isoelectric points of the mixture. For example, in a fibre-water mixture having an effective isoelectric point of 5.2 pH it was possible to maintain and hold uniformly a pH value of from 5.0 to 5.1 and from 5.4 to 5.5 but as I attempted to elevate the pH from 5.1 to 5.2 by most carefully controlled addition of chemical, the pH value would increase to 5.5 or 5.7, and then on subsequent careful reduction of added chemical in an attempt to bring it back to 5.1, the pH value would decrease sharply to 4.6 or 4.7.

This process, therefore, provides for the making of paper in which there is an electrical balance between the constituents and one which is relatively free from galvanic paper static.

Ordinary paper-making operations are apt to result in the development of battery-like formations of particles having unbalanced electrical charges, the presence of which battery-like formations produces galvanic static in the sheet.

One advantage of my invention is that it eliminates to a great extent the development of these battery-like formations and the consequent resultant galvanic static so that a sheet of paper made in accordance with my invention will be relatively free from galvanic static electricity. The presence of a paper highly charged with static electricity offers difficulty in subsequent conversion or use and gives a paper characteristic which makes it less adapted for use in printing, coating, winding and cutting. Particularly this is true on paper machines equipped with sheet cutters on the dry end, as paper heavily charged with static does not lie flat under the knives, but curls more or less and results in the production of unevenly cut paper.

In addition to the difficulties to the cutting or converting paper machines, a further deteriorating effect occurs in paper which contains a high charge of static electricity. Such paper decreases in physical test upon ageing, due probably to the continual migration and shifting of electrical charges which result in setting up galvanic and frictional electricity within the paper.

The location in the fibre-water flow at which the fibre-water mixture is subjected to this electrolytic action is not important although there are advantages in so carrying out the process that the electrolytic action will take place as close to the paper machine wire as possible in order to minimize the effect of possible loss of electrical charges or possible disruption of an electrostatic bond through grounding or leakage through the metal frames of the machines, water lines, etc. It would also be possible to carry out the process by an arrangement according to which the electrolysis would take place on the wire itself.

While I prefer to use a uni-directional current for charging the electrodes or for treating electrically the fibre-water mixture yet it is within my invention to employ any type of current, whether D. C. or A. C. or a combination of both, by which the above-named results can be secured.

In the drawing I have illustrated diagrammatically some ways in which the invention may be carried out.

Fig. 1 is a diagrammatic view of the paper-making operation embodying the invention in which the paper-making wire constitutes one of the electrodes.

Fig. 2 illustrates the invention as it may be applied to a cylinder machine.

Fig. 3 illustrates another manner of carrying out the invention.

Fig. 4 is a section on the line 4—4, Fig. 3.

Fig. 5 is a plan view of the headbox 12 and one end of the wire 11 showing the electrodes 14.

Referring first to Fig. 3, 1 indicates a flow box through which the fibre-water mixture flows to the paper-making wire. Situated in this box are a plurality of electrodes 2, 3, the electrodes 2 being anodes carrying positive charges of electricity and the electrodes 3 being cathodes carrying negative charges of electricity. These electrodes may be in the form of plates arranged in parallel relation, the alternate plates being anodes 2 and the other plates being cathodes 3. The plates are connected in a charging circuit with the anodes 2 connected to one side 4 of the circuit and the cathodes 3 connected to the other side 5 of the circuit. This circuit includes a suitable generator for generating uni-directional current and the circuit also includes the usual ammeter 7, volt meter 8 and variable resistance 9. The circuit is also illustrated as having a reversing switch 10 therein. When the circuit is operating the anodes 2 will be positively charged, while the cathodes 3 will be negatively charged and there will be a flow of current from the anodes to the cathodes through the fibre-water mixture flowing between the electrodes.

The rate of flow of the fibre-water mixture, the size of the electrodes and their dimension in the direction of flow have such a relation that during the time that any portion of fibre-water mixture is passing through the electrified zone the more active negatively-charged colloids above-referred to will be attracted to the positively-charged anodes and upon contact therewith will take a positive charge of electricity and then be discharged from the anodes as a gel. The negatively-charged cellulose fibres, however, are so sluggish in their movement that they will be carried by the flowing movement of the fibre-water mixture through and beyond the electrodes before they have time to be attracted into contact with the anodes to any appreciable extent, and, therefore, as the fibre-water mixture flows through the electrified zone the active colloids will be positively charged but the cellulose fibre will not receive any positive charge to any appreciable extent. As stated above, the positively-charged particles of starch, rosin, clay or other material, which are discharged from the anodes 2 become attracted to and unite with the negatively-charged cellulose fibre to produce the bonding effect above-described. In the operation of this device an important feature is to maintain such a relation between the rate of flow of the fibre-water mixture, the size and position of the electrodes and the intensity of the electrical charge thereon, that while the more active negatively-charged colloids will be attracted to the anodes and thus become positively charged, the slower moving cellulose fibre will pass through the electrified zone before the fibres in any appreciable amount have time to become attracted to and contact with the anodes 2. In practicing the invention I have secured successful results by using electrodes in the form of plates which are longer than they are wide and which are placed in the flow box in relatively close parallel relation with the lengthwise direction of the plates parallel to the direction of flow and using the current for an ordinary lighting circuit for charging the plates. The length of the plates should have such relation to the rate of flow that the active negatively charged colloids will be attracted to and thereby come in contact with the positively charged plates during the flow of the fibre-water mixture through the electrified zone while the slower moving or sluggish cellulose fibres will not become attracted to or contacted with the positively charged electrodes in any appreciable amounts while they are flowing through the electrified zone. As the process is continued a deposit will gradually accumulate on the cathodes which if left to remain there would interfere with the operation. When such deposit begins to accumulate it can be removed by reversing the switch 10 so that the former cathodes 3 will constitute the anodes and the former anodes 2 will constitute the cathodes. The reversal of polarity of the electrodes results in automatically clearing the electrode plates.

In Fig. 1, 11 constitutes the paper-making wire of a Fourdrinier machine and 12 is the headbox from which the fibre-water mixture 13 flows onto the wire. Situated in the headbox are a plurality of electrodes 14 which are connected by a wire 15 to a generator 16, the other wire 17 of the circuit being connected to the couch roll 18 over which the wire 11 passes so that the wire 11 constitutes the other electrode. With this construction it will be necessary, of course, to insulate the wire 11 and the breast roll 19 and couch roll 18, and the wire-carrying rolls 20. The operation of this embodiment is the same as that above-described. In this embodiment the electrodes 14 may constitute the anodes which are positively charged and the wire 11 constitutes the cathode which is negatively charged. The operation of the device is similar to that above-described. As the fibre-water mixture 13 flows past the anodes 14 the active colloids will be attracted to the anodes 14, and upon contact therewith will become positively charged and discharged therefrom as gel, while the more sluggish cellulose fibres will pass the anodes without contacting therewith, and as the fibre-water mixture flows onto the wire the gel colloids, starch, clay, rosin alum precipitate, etc., will become electrostatically bonded to the cellulose fibre.

In Fig. 2 there is shown a cylinder machine having the cylinder 21 operating in the vat 22. 23 indicates a series of electrodes similar to the electrodes 14 in Fig. 1 which are immersed in the tank adjacent the point where the fibre-water mixture is delivered thereto. These electrodes 23 and the cylinder 21 are connected to the generator 24 through the wire connections 25, 26, the electrodes 23 constituting the anodes and the cylinder 21 constituting the cathodes. The operation of the installation shown in Fig. 2 is similar to that in Figs. 1 to 3. As the fibre-water mixture flows past or through the electrodes 23 the more active colloids, such as starch, clay, rosin alum size precipitate, etc., which are normally negatively-charged, become attracted to and contact with the anodes 23 and are discharged therefrom as a gel having positive charges of electricity. Such positively-charged colloids then become united to or bonded with the cellulose fibre, which is negatively charged by means of the electrostatic bond above-referred to. In this embodiment also it is desirable that the rate of flow of fibre-water mixture past the electrodes 23 should be such that the more active negatively-charged colloids will have opportunity to contact with and receive their positive charge of electricity from the electrodes while the more sluggish cellulose fibre will pass between the electrodes without receiving positive charges therefrom.

I claim:

1. The method of making paper from fibre-water mixture containing negatively-charged colloids which consists in flowing the fibre-water mixture over electrically-charged anode and cathode electrodes and maintaining the fibre-water mixture in the electrified zone between said electrodes for a time period which is sufficient for the negatively-charged colloids to be attracted to the anode and to be discharged therefrom as positively-charged gel, but which is insufficient to permit any appreciable number of the cellulose fibres to be attracted into physical contact with the anode, whereby the positively-charged gel discharged from the anode unites with the negatively-charged cellulose fibre and becomes electrostatically bonded thereto.

2. The method of making paper from fibre-water mixture containing negatively-charged colloids and negatively-charged cellulose fibre, which consists in flowing the fibre-water mixture in contact with positively-charged electrode plates having their lengthwise direction in the direction of flow and maintaining the fibre-water mixture in the zone subject to the electrical action of said plates for a sufficient time to permit the negatively-charged colloids to be attracted to and contact with said plates but insufficient to permit the negatively-charged cellulose fibres to be attracted to said plates in any appreciable amount.

3. The method of treating flowing fibre-water mixture containing cellulose fibre and colloidal particles having an electrical surface charge similar to that of the fibre, which method consists in flowing the mixture past positively charged electrode plates which extend a considerable distance in the direction of flow and at a rate of speed greater than that required for the cellulose fibre to be attracted to said plates but less than that required for the colloidal particles to be so attracted, whereby the colloidal particles are attracted to the positively charged plates and thus become positively charged while the cellulose fibres flow past the plate without being so attracted.

DONALD K. PATTILLOCH.